L. J. R. HOLST.
INDEX DEVICE FOR STEP AND REPEAT AND OTHER MACHINES.
APPLICATION FILED MAR. 13, 1912.
1,048,968.
Patented Dec. 31, 1912.
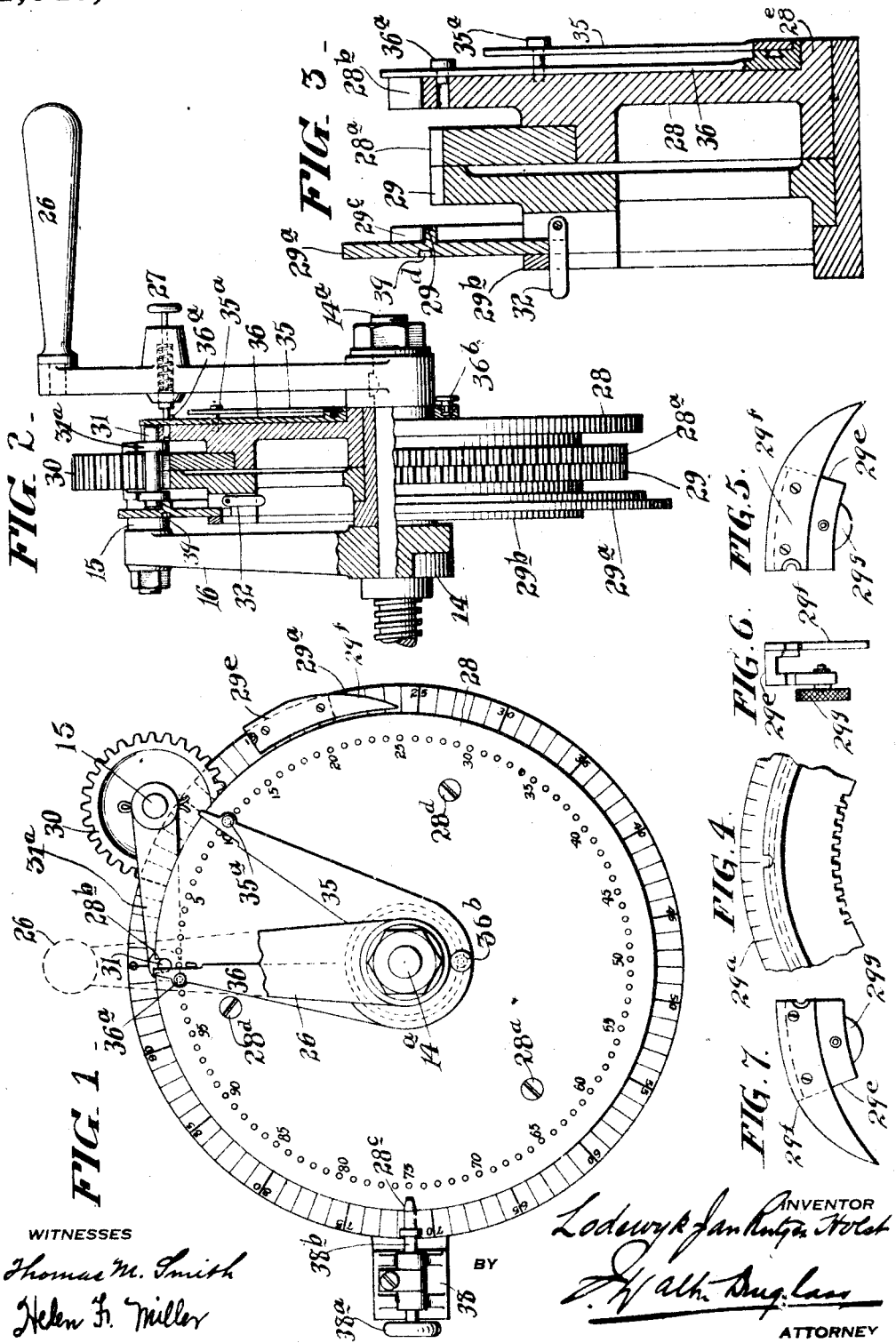

UNITED STATES PATENT OFFICE.

LODEWYK JAN RUTGER HOLST, OF LANSDOWNE, PENNSYLVANIA, ASSIGNOR TO WILLIAMS, BROWN AND EARLE, INC., OF PHILADELPHIA, PENNSYLVANIA, A CORPORATION OF PENNSYLVANIA.

INDEX DEVICE FOR STEP AND REPEAT AND OTHER MACHINES.

1,048,968.  Specification of Letters Patent.  Patented Dec. 31, 1912.

Application filed March 13, 1912. Serial No. 683,483.

*To all whom it may concern:*

Be it known that I, LODEWYK JAN RUTGER HOLST, a citizen of the United States, residing at Lansdowne, in the county of Delaware and State of Pennsylvania, have invented certain new and useful Improvements in Index Devices for Step and Repeat and other Machines, of which the following is a specification.

My invention has relation to an index device adapted for employment in connection with an apparatus which has become known as a step and repeat machine for photographic lens work among many other practical uses therefor; and in such connection the present invention relates to the general constructive arrangement of such a device.

The nature and scope of my present invention will be more fully understood from the following description taken in connection with the accompanying drawings, in which—

Figure 1, is a front elevational view of a locking device, embodying the main features of my invention. Fig. 2, is a side elevational view partly in section, of said locking device. Fig. 3, is a detail view in section of means for locking the index ring of said device. Fig. 4, is a view in broken section, showing in detail the notches on the inner circumference of the division ring; and Figs. 5, 6 and 7, are respectively, in side and front elevations, the right-hand rider and inside elevation, the left-hand rider of the index-ring.

Referring to the drawings, 14$^a$, in Figs. 1 and 2, is the spindle upon which the main parts of the mechanism are mounted. This spindle is supported in a suitable bearing 14, of a bracket 16, which latter is rigidly attached to the framework of the machine to which the index device is applied. Keyed to the spindle 14$^a$, is the crank-handle 26, which carries a laterally movable pin 27, adapted to engage any one of a number of perforations, one hundred in the case as illustrated, and circularly disposed near the edge of the index plate 28. This index plate 28, is freely mounted on a bushing attached to the spindle 14$^a$, and has two notches 28$^b$ and 28$^c$, cut in its circumference. The notch 28$^b$, coincides radially with the position of the zero-point of the divisions engraved on the index plate, and the notch 28$^c$, may be at any convenient point of the circumference, where it can be brought into engagement with a locking-pin 38$^b$, slidable by means of the knob 38$^a$, in the bracket 38, rigidly attached to any convenient part of the framing of the machine not shown, and to which the index device is applied. The purpose of both notches will be explained later.

The index plate 28, carries concentrically on its back the spur-gear 28$^a$, rigidly connected to it by means of a series of screws 28$^d$. This spur-gear 28$^a$, is adapted to mesh with the pinion 30, having any convenient number of teeth and which is rotatably mounted on the pivot 15, attached to the bracket 16. Directly behind the index-plate 28, with its spur-gear 28$^a$, a second spur-gear 29, is loosely mounted on the before-mentioned bushing of the spindle 14$^a$. The number of teeth in the gear 29, is one less than that in the gear 28$^a$. The pinion 30, is wide enough to simultaneously mesh with both spur-gears. The spur-gear 29, carries loosely the ring 29$^a$, concentrically mounted on the back thereof. This ring is provided with a number of incisions radiating from its inner edge, and corresponding in number to that of the teeth of the gear 29. The retaining ring 29$^b$, serves to hold the ring 29$^a$, on the gear 29, and the locking lever 32, in Figs. 2 and 3, permits the locking of the ring 29$^a$, and the gear 29, rigidly together by engaging any one of said incisions, or permits of the rotating of the ring 29$^a$, independently of the spur-gear 29, after being disengaged from said incisions. The front of the ring 29$^a$, is provided with a projecting ring 29$^d$, Fig. 3, of an outer diameter corresponding to the outer diameter of the index plate 28. The portion of the ring 29$^a$, outside of the projecting ring 29$^d$, is provided with divisions corresponding to the number of teeth in the spur-gear 29. These latter divisions are entirely separate from the divisions provided on the index-plate 28, and serve a different purpose to be fully explained in the description of the operation of the device. In the device here illustrated, the spur-gear 28$^a$, has 96 teeth, and the spur-gear 29, has 95 teeth, hence the rim of the index ring 29$^a$, is divided in 95 parts, each division line corresponding in location with the middle of one of the incisions in the inner edge of said ring. Similarly to the index-plate 28, the projecting ring 29$^d$, of the index-ring 29$^a$, has a notch 29$^c$, at a point corresponding with the zero-point of its divisions. The notch 29$^c$, can thus be adjusted to stand immediately behind the corresponding notch 28$^b$, in the index-plate 28, thereby permitting of the locking of the index-plate 28, and the index-ring 29$^a$, simultaneously against rotation, by engaging in the notches the laterally projecting pin 31, of the catch 31$^a$, which is rotatably mounted on the pivot 15. When so locked the zero-points of the divisions on the index-plate 28, and on the index-ring 29$^a$, will stand in the same circumferential position.

The front of the index-plate 28, is provided with an extended hub 28$^e$, upon which is rotatably mounted the spring acting index finger 36. This finger itself carries a hub-shaped projection upon which the similarly spring acting index finger 35, is mounted. A groove in the hub of the finger 36, engages the head of a screw 36$^b$, serving to lock the two fingers together in any desired angular adjustment. Both fingers project beyond the rim of the index-plate 28, and are made of suitably tempered steel thin enough to permit of lifting the pins 36$^a$ and 35$^a$, out of engagement with the perforations of the index-plate 28, whenever they are to be moved around said plate. Said pins 36$^a$ and 35$^a$, engage perforations of the index-plate when at rest in their adjusted position, thereby preventing the fingers from accidental or unobserved shifting of their position.

A rider 29$^t$, is adapted to be adjusted and secured to any required point on the index-ring 29$^a$, the left edge of which rider is cut out for the purpose of engaging with the rear end of the pin 31, of the catch 31$^a$, thereby holding said catch out of engagement with the notches 28$^b$ and 29$^c$. This rider 29$^e$ is either right handed as illustrated in Figs. 1 and 5, for a clock-wise rotation of the device, or left-handed as illustrated in Fig. 7 when the mechanism is to be operated in a counter-clockwise direction.

The right and left hand riders as shown in Figs. 5, 6 and 7, respectively, are designed to straddle the outer edge of the ring 29$^a$, as shown in Fig. 1, and to be clamped at the desired point by means of the knurled screw 29$^g$, the end of which reaches to the bottom of the circular groove 39, in the back of the ring 29$^a$. This groove retains the end of the screw 29$^g$, and thus prevents the rider from dropping off when the screw is loosened.

The operation of the mechanism as described, to automatically stop the rotation of the shaft 14$^a$, after it has completed a certain predetermined number of complete revolutions, with or without any additional fraction of a revolution, can be best explained by means of a numerical example, for which purpose it is assumed that starting from the zero-position, the shaft 14$^a$, is to make 15 and 1/10 revolutions. In that case the rider 29$^e$, is attached to the index-ring 29$^a$, so that its left front edge coincides with the division line 15, of the said ring, as shown in Fig. 1, said ring serving for the indicating and regulating of any number of complete revolutions. Now the finger 36, is brought into contact with the pin 27, of the crank-handle 26, which engages the hole zero of the index-plate divisions. The pin 36$^a$, of the finger 36, will then engage the hole 99. The finger 35, is turned until its pin 35$^a$, engages the hole number 11, in which position the nut on the screw 38$^b$, is securely tightened. The pin 27, of the handle 26, is now withdrawn from engagement with the zero hole in the index-plate 28, and this handle turned until the pin 27, abuts against the inner face of the finger 35, in which position it is directly in line with the hole 10, of the index-plate 28, and is pressed into engagement therewith, whereby the shaft 14$^a$, has been rotated through 1/10 of a revolution as regulated by the perforation in the index-plate. Now the locking lever 32, is turned downward as shown in Fig. 2, and the catch-pin 31, lifted out of the notches 29$^c$ and 28$^b$, thereby liberating the index-ring 29$^a$, which is now turned counter clock-wise, until the recess in the left edge of the rider receives the pin 31, whereupon the locking-lever 32, is again put in operative position as in Fig. 3. The notches for the engagement of the said lever 32, being clearly illustrated in Fig. 4. This movement has brought and locked division mark "15", of the ring 29$^a$, into a position corresponding with the zero-mark of the index-plate 28. It will be observed that when lifting the catch-pin 31, out of the notches 28$^b$ and 29$^c$, of the plate 28, and the ring 29$^a$, these elements are not yet unlocked, but the pin 38$^b$ must be also withdrawn from the notch 28$^c$, in the plate 28, before this plate and the ring 29$^a$, can be rotated around their common spindle 14$^a$. The shifting of the handle 26, from the zero-point to the hole number 10, has turned the handle 26, and with it the shaft 14$^a$, through 10/100 or 1/10 of a revolution. It remains thus to now make still 15 revolutions to complete the assumed operation. To effect this, the pin 38$^b$, is now withdrawn from engagement with the notch 28$^c$, and the crank-handle 26, is rotated in a clock-wise direction. The pin 27, of this handle causes the index-plate 28, to rotate with the said handle and consequently the spur-gear 28$^a$, to act as a driver for the pinion 30, causing thereby the said pinion in its turn to drive the spur-gear 29. As the latter spur-gear has one tooth less than the spur-gear 28ª, it will gain one tooth over the wheel 28ª, for every complete revolution of the latter. Therefore, after completing 15 revolutions of the wheel 28ª, the wheel 29, will have gained 15 teeth, whereby the notch 29ᶜ, of the index-ring 29ª, attached to the wheel 29, will again have reached a corresponding radial position with the notch 28ᵇ, of the said index-plate. The lock-pin 31, will thus drop into these two notches and lock the entire mechanism against further rotation. The entire operation can now be repeated by first locking the pin 38ᵇ, in the notch 28ᶜ, and by then again adjusting the handle 26, and the ring 29ª, as previously described, and finally again unlocking the pin 38ᵇ.

Having thus described the nature and objects of my said invention, what I claim as new and desire to secure by Letters Patent is:—

1. In an index device, a spindle journaled to a stationary part of the device, a pivot carried by said stationary part, a pinion and a catch freely mounted on said pivot, a handle keyed to said spindle, a perforated index-plate loosely mounted on said spindle, a laterally movable pin in said handle adapted to engage the perforations of said index-plate, movable fingers on the face of said index-plate to regulate the adjustments of the handle on said index-plate, a concentrically mounted spur-wheel at the back of said index-plate, said spur-wheel meshing with said pinion, a second spur-wheel loosely mounted on the spindle of said index-plate and also meshing with said pinion, said second spur-wheel having a number of teeth differing by one from the number of teeth of the spur-wheel of said index-plate and a ring arranged concentrically on the back of said second spur-wheel and rotatable in a plane parallel therewith, said ring being adapted to be clamped thereto and the outer portion of said ring carrying divisions corresponding to the number of teeth of said second spur-wheel, said index-plate and ring each being provided with a notch at a point of their periphery corresponding with the zero-point of the perforations of said index-plate and of the divisions of said index-ring respectively, said catch pivoted on the stationary part of said locking device being arranged to engage simultaneously both of said notches, thereby to lock said index plate and ring in their respective zero-positions.

2. In an index device, a spindle, a locking device controlling said spindle and having a stationary part supporting said spindle, a handle keyed to said spindle, a perforated index-plate loosely mounted on said spindle, a laterally movable pin in said handle adapted to engage the perforations of said index-plate, said index-plate being provided with a notch, adjustable index fingers on the face of the index-plate to limit movement of said handle within one complete revolution and a catch adapted to engage and disengage the notch of said index-plate so as to permit a determined number of complete revolutions of said handle and spindle in unison with said index-plate.

3. In an index device, a spindle journaled to a stationary part of the device, a perforated index-plate to indicate the fraction of a revolution of said spindle, an index-ring to indicate complete revolutions of said spindle, said index-plate and index-ring being both journaled freely on said spindle and operative connections to cause said index-plate and index-ring to return to and stop at their common zero-point after having made a number of complete revolutions with said spindle.

4. In an index device, an index plate having division holes and spring acting fingers provided with lock-pins, said fingers projecting beyond the edge of said plate so as to permit of ready disengagement of the lock-pins of said fingers from the division holes of said plate.

5. In an index device, the combination with a support and an index-plate provided with two notches and a movable catch, adapted to engage one of said notches of a movable lock-pin, adapted to engage the other of said notches, thereby to hold said index-plate in a locked position after said movable catch has been disengaged.

6. In an index device, the combination of two members having divisions, operatively connected with each other, the divisions of one of said members indicating and controlling a fractional revolution and the division of the other of said members indicating and controlling complete revolutions, substantially as and for the purposes described.

7. In an index device, the combination of two adjustable index members said members having divisions adapted respectively to indicate and control fractional and complete revolutions of said members, substantially as and for the purposes described.

8. In an index device, the combination of two adjustable index members, said members having divisions adapted respectively to indicate and control fractional and complete revolutions and means to lock said members.

9. In an index device, the combination of two adjustable index members, said members having divisions adapted respectively to indicate and control fractional and complete revolutions and means to lock said members at the termination of any predetermined number of revolutions thereof.

10. In an index device, an index-plate provided with a pair of fingers having pins arranged to engage division-holes of said plate, and said plate also having notches and a catch, in combination with a lock-pin arranged to hold said plate in a locked position, after the said catch has been disengaged.

In witness whereof, I have hereunto set my signature in the presence of the two subscribing witnesses hereto.

LODEWYK JAN RUTGER HOLST.

Witnesses:
THOMAS M. SMITH,
HELEN F. MILLER.